United States Patent
Mizuguchi et al.

(10) Patent No.: US 6,833,964 B2
(45) Date of Patent: Dec. 21, 2004

(54) ZOOM LENS SYSTEM

(75) Inventors: Keiko Mizuguchi, Kawasaki (JP); Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/124,271

(22) Filed: Apr. 18, 2002

(65) Prior Publication Data

US 2003/0072085 A1 Apr. 17, 2003

(30) Foreign Application Priority Data

Apr. 23, 2001 (JP) .................................. 2001-124314
Feb. 27, 2002 (JP) .................................. 2002-051175

(51) Int. Cl.$^7$ ................... G02B 15/177; G02B 15/163
(52) U.S. Cl. ...................................... 359/689; 359/682
(58) Field of Search ................... 359/689, 680, 359/681, 682

(56) References Cited

U.S. PATENT DOCUMENTS

| | | | |
|---|---|---|---|
| 5,270,863 A * | 12/1993 | Uzawa | 359/682 |
| 5,909,318 A | 6/1999 | Tanaka | 359/689 |
| 6,124,984 A | 9/2000 | Shibayama et al. | 359/689 |
| 6,349,002 B1 | 2/2002 | Shibayama et al. | 359/689 |
| 6,417,973 B2 * | 7/2002 | Mihara et al. | 359/684 |
| 6,452,729 B2 * | 9/2002 | Yamamoto | 359/676 |
| 6,515,804 B2 * | 2/2003 | Watanabe et al. | 359/689 |
| 2003/0043474 A1 * | 3/2003 | Minefuji | 359/689 |

FOREIGN PATENT DOCUMENTS

| | | |
|---|---|---|
| JP | 10-170826 | 6/1998 |
| JP | 10-293253 | 11/1998 |
| JP | 11-23967 | 1/1999 |
| JP | 11-52246 | 2/1999 |
| JP | 2001-13408 | 1/2001 |

* cited by examiner

*Primary Examiner*—Georgia Epps
*Assistant Examiner*—Deborah A. Raizen
(74) *Attorney, Agent, or Firm*—Miles & Stockbridge P.C.

(57) ABSTRACT

The present invention provides a zoom lens system suitable for an image gathering system using a solid-state imaging device, having a zoom ratio of about three, a small total lens length, and superb optical performance. According to one aspect, in order from the object side, a first lens group having negative refractive power, a second lens group having positive refractive power, and a third lens group having positive refractive power. Zooming is carried out by varying distances between adjacent lens groups. The first lens group includes two negative lens elements and a positive lens element. The second lens group includes three lens elements consisting of a first positive lens element, a second positive lens element, and a negative lens element. The third lens group includes at least one positive lens element. Predetermined conditional expressions are satisfied.

8 Claims, 12 Drawing Sheets

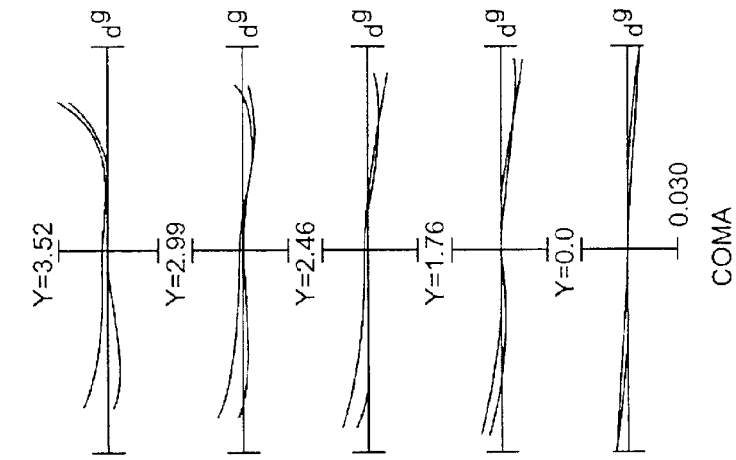
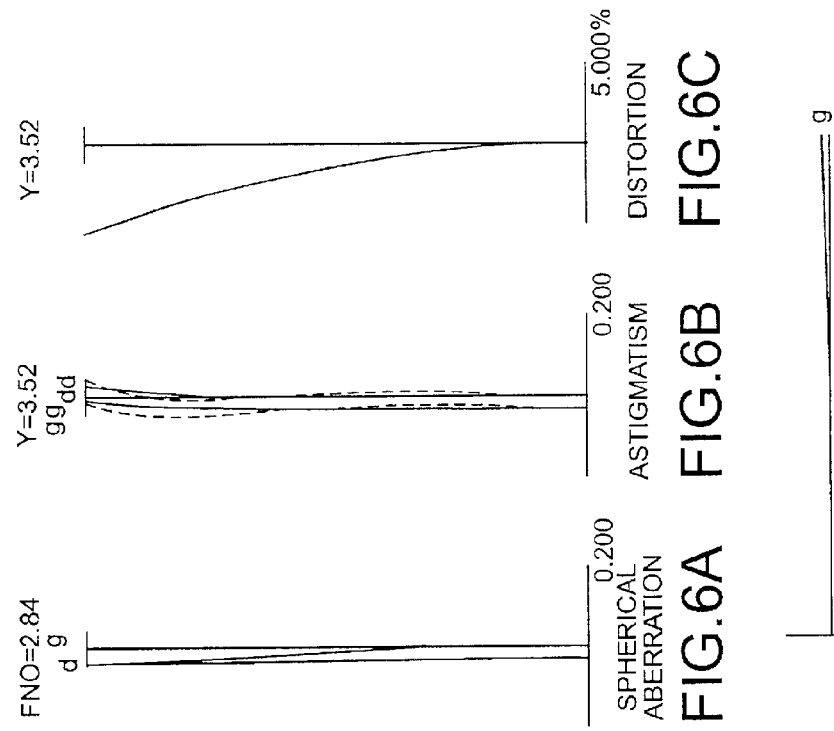

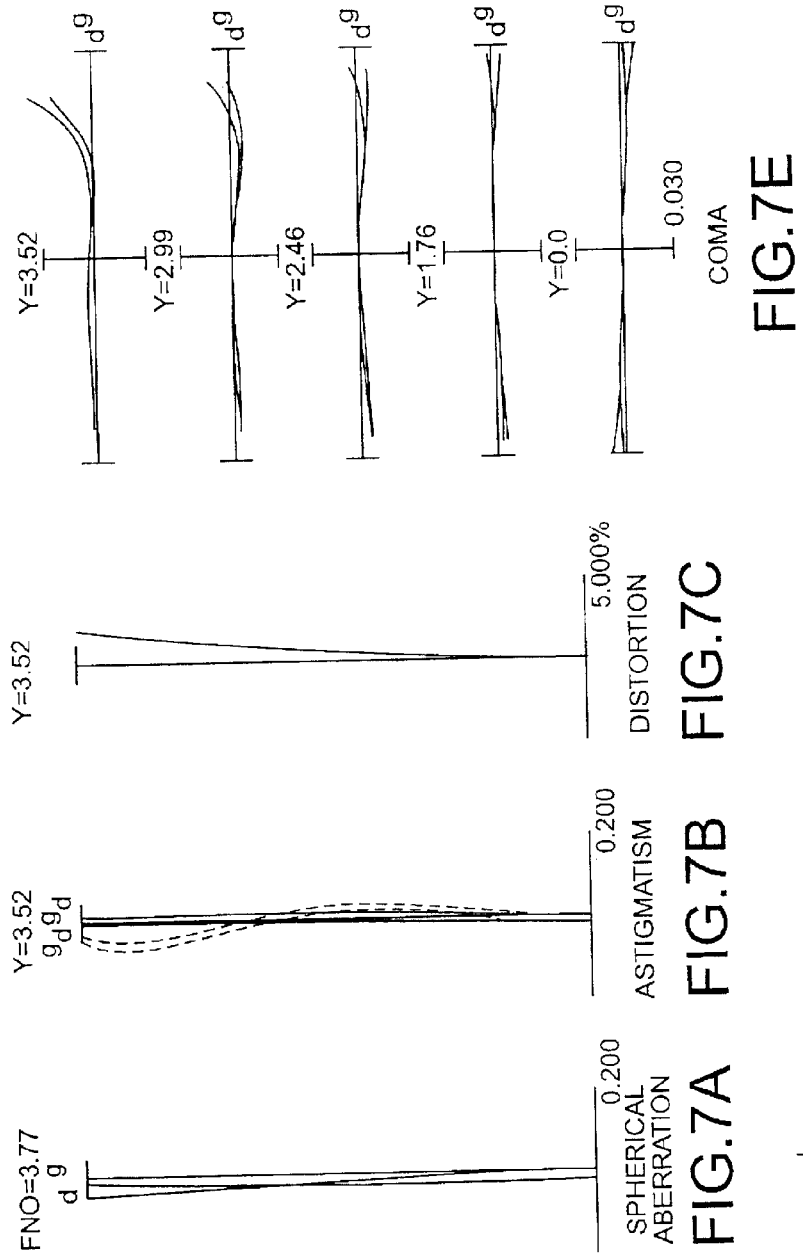

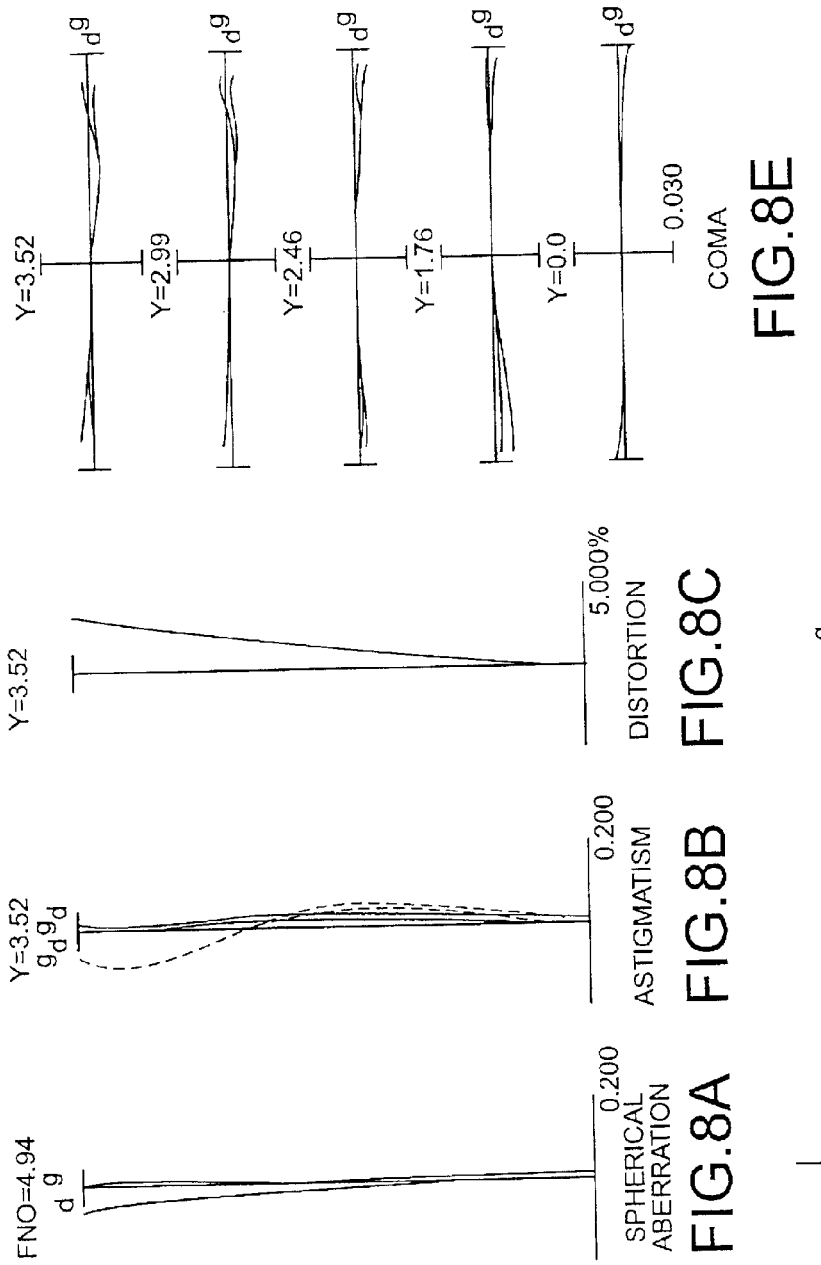

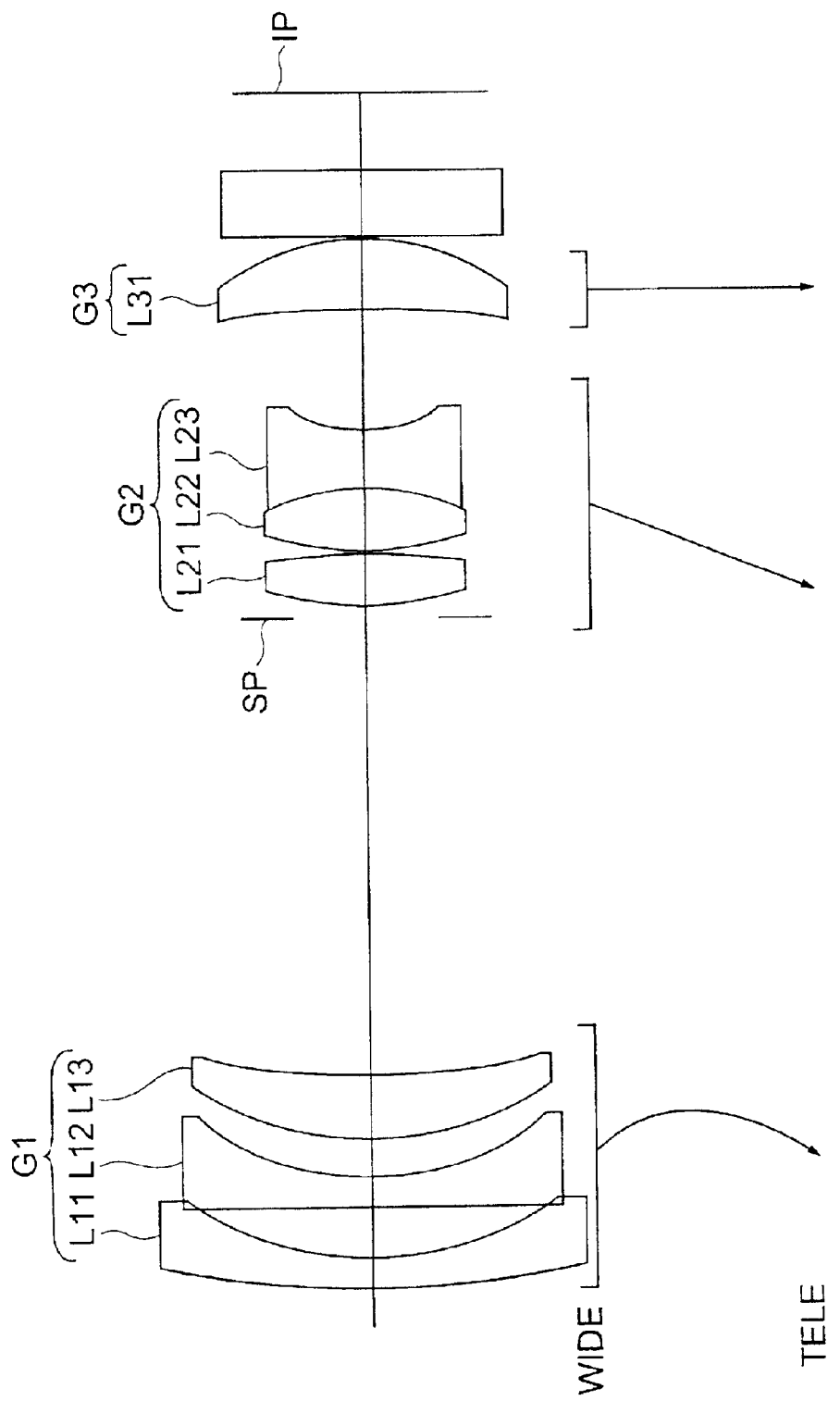

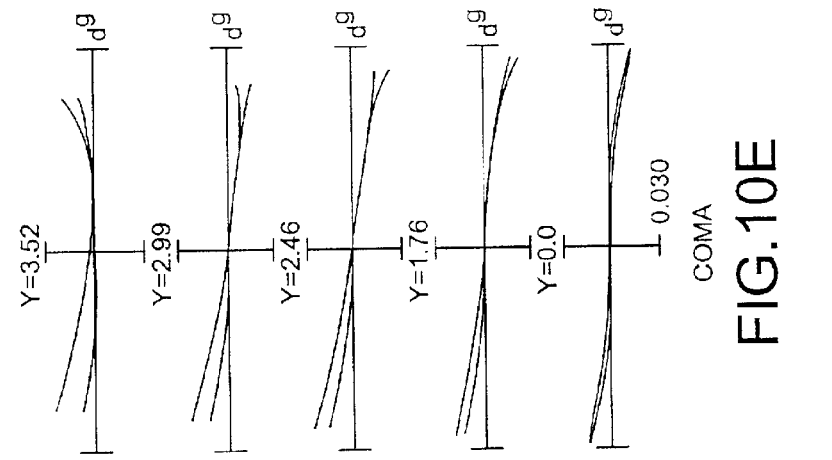
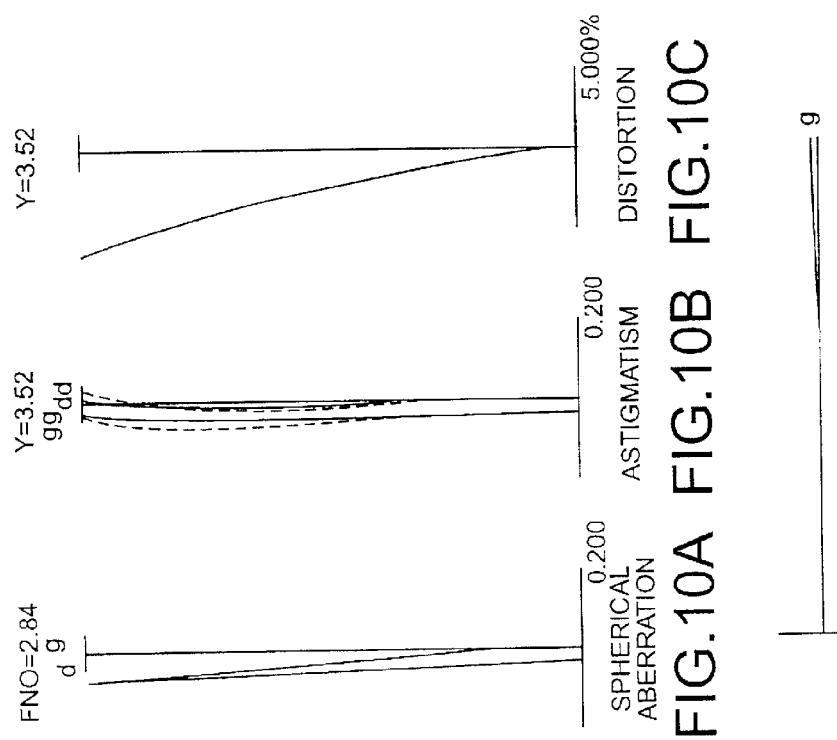

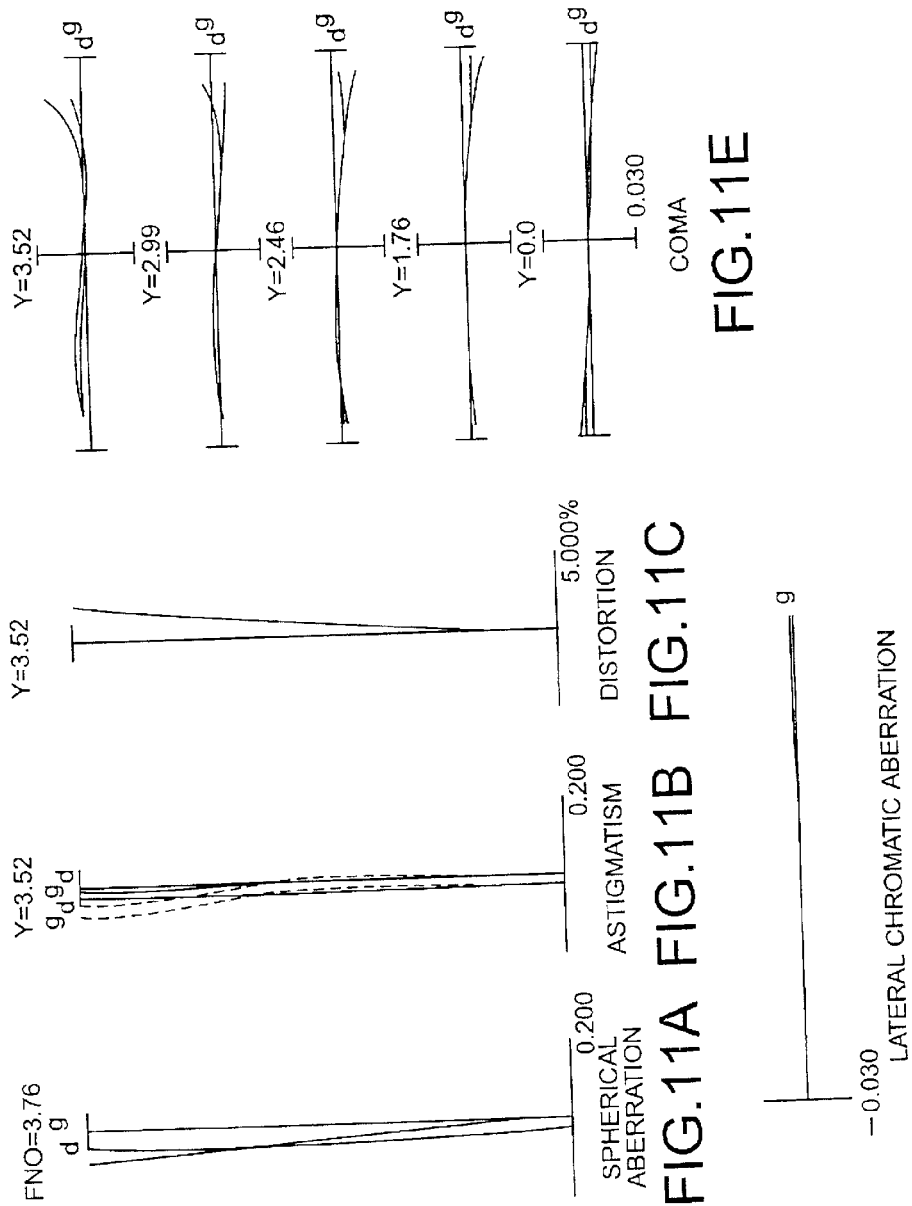

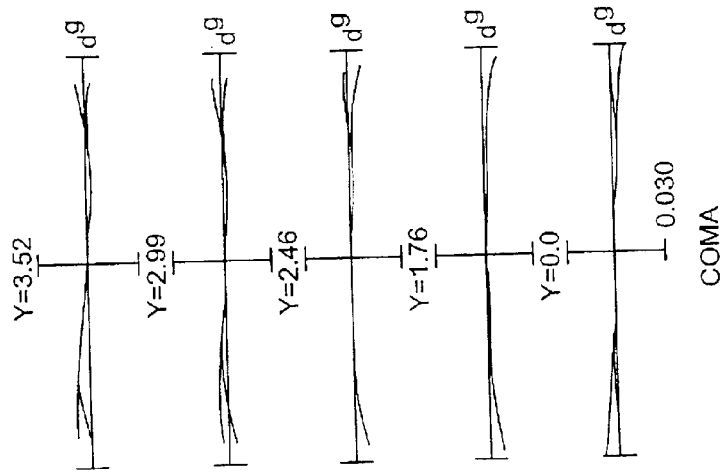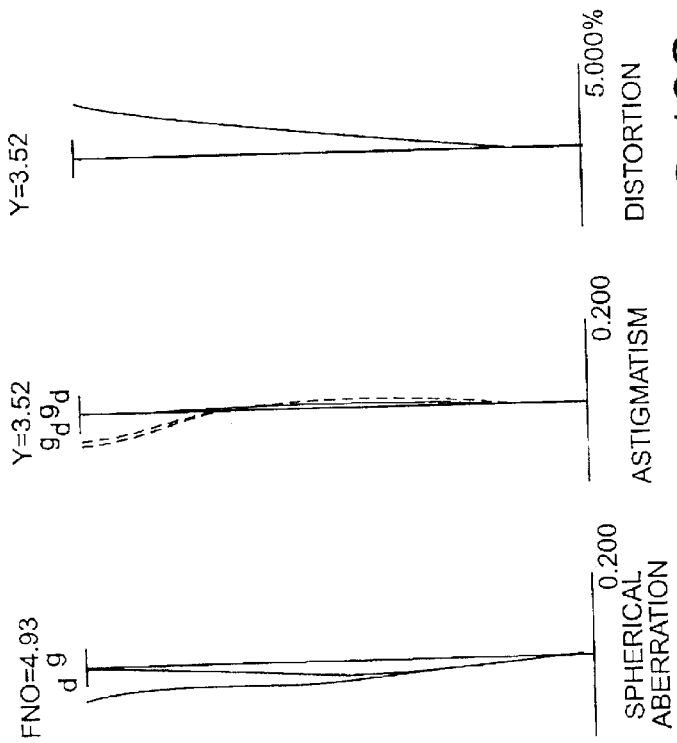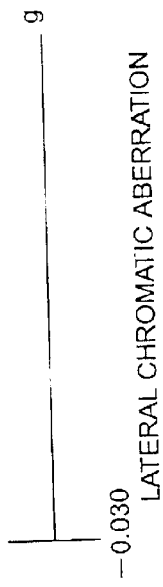

ZOOM LENS SYSTEM

This application claims the benefit of Japanese Patent applications No. 2001-124314 and No. 2002-051175 which are hereby incorporated by reference.

BACKGROUND OF THE INVENTION

1. Field of the Invention

The present invention relates to a compact zoom lens system and, in particular, to a zoom lens system designed specially to be compact with its whole optical system, being suitable for such as a digital still camera

2. Related Background Art

In an image gathering system using a solid-state imaging device, in order to arrange a low-pass filter or a color correction filter, a lens system having a relatively long back focal length is required. Moreover, a lens system having a good telecentricity on an image side is required. In these days, compactness and low cost are also required to a lens system in addition to satisfying these requirements.

A three-lens-group zoom lens system having, in order from an object side, a first lens group having negative refractive power, a second lens group having positive refractive power, and a third lens group having positive refractive power wherein zooming from a wide-angle end state to a telephoto end state is carried out by moving the first lens group and the second lens group has been proposed in Japanese Patent Application Laid-Open No. 10-293253. However, the zoom lens system proposed in Japanese Patent Application Laid-Open No. 10-293253 has drawbacks such as relatively large number of lens elements composing each lens group, relatively large total lens length, and higher manufacturing costs.

Moreover, Japanese Patent Application Laid-Open No. 2001-13408 discloses an optical system in which the number of lens elements composing a first lens group is reduced. However, a positive lens element is arranged on the most object side of a first lens group having negative refractive power, so that it has a drawback that the diameter of the lens system inevitably becomes large when the system is made to have a wider angle of view.

Furthermore, since the first lens group separates largely from the aperture stop in the wide-angle end state, the height of an off-axis ray incident to the first lens group becomes large, so that the diameter of the lenses composing the first lens group becomes large. As a result, the lens system has a drawback that the whole lens system becomes large.

SUMMARY OF THE INVENTION

The present invention is made in view of the aforementioned problems and has an object to provide a zoom lens system suitable for a image gathering system using a solid-state imaging device, having a zoom ratio of about three, a small total lens length, and superb optical performance.

According to one aspect of the present invention, a zoom lens system includes, in order from an object, a first lens group having negative refractive power, a second lens group having positive refractive power, and a third lens group having positive refractive power. Zooming is carried out by varying distances between adjacent lens groups. The first lens group includes two negative lens elements and a positive lens element. The second lens group includes three lens elements consisting of a first positive lens element, a second positive lens element, and a negative lens element. The third lens group includes at least one positive lens element. The following conditional expression (1) is satisfied:

$$2.5 < TL/(ft \times fW)^{1/2} < 4.5 \tag{1}$$

where TL denotes the distance between the most object side lens surface of the zoom lens system and the image plane, fw denotes the focal length of the zoom lens system in a wide-angle end state, and ft denotes the focal length of the zoom lens system in a telephoto end state.

BRIEF DESCRIPTION OF THE DRAWINGS

FIGS. 6A through 6E are graphs showing various aberrations of the zoom lens system according to Example 2 in the wide-angle end state.

FIGS. 7A through 7E are graphs showing various aberrations of the zoom lens system according to Example 2 in the intermediate focal length state.

FIGS. 8A through 8E are graphs showing various aberrations of the zoom lens system according to Example 2 in the telephoto end state.

FIG. 9 is a sectional view showing a zoom lens system according to Example 3 of the present invention.

FIGS. 10A through 10E are graphs showing various aberrations of the zoom lens system according to Example 3 in the wide-angle end state.

FIGS. 11A through 11E are graphs showing various aberrations of the zoom lens system according to Example 3 in the intermediate focal length state.

FIGS. 12A through 12E are graphs showing various aberrations of the zoom lens system according to Example 3 in the telephoto end state.

DETAILED DESCRIPTION OF THE PREFERRED EMBODIMENTS

Figure 1:
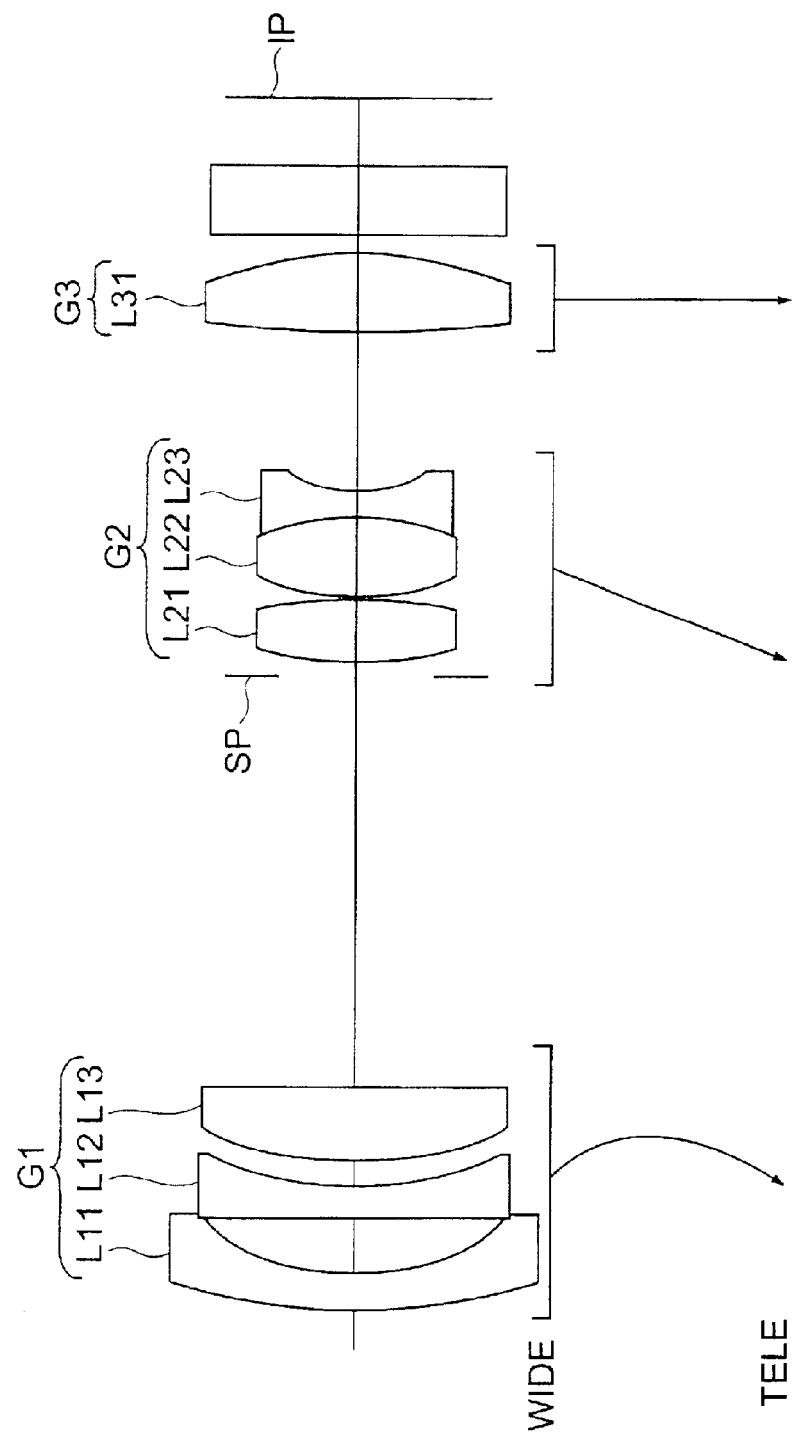
FIG. 1 is a sectional view showing a zoom lens system according to Example 1 of the present invention.

The preferred embodiments according to the present invention are going to be explained below.

Conditional expression (1) defines the dimension of the total lens length with respect to the focal length of the zoom lens system. When the ratio $TL/(ft \times fw)^{1/2}$ exceeds the upper limit of conditional expression (1), the total lens length of the zoom lens system becomes too long, so that the zoom lens system cannot be compact. On the other hand, when the ratio falls below the lower limit of conditional expression (1), the number of lens elements composing the zoom lens system according to the present invention cannot be arranged. It is preferable that conditional expression (1) is satisfied over entire zooming range from wide-angle end state to telephoto end state.

Moreover, it is more preferable that either one or both of the upper and lower limits are satisfied 4.2 and 3.0, respectively.

In the present invention, it is preferable that a first lens group is composed of a first negative lens element constructed by a negative meniscus lens having a concave surface facing to an image side, a second negative lens element, and a positive lens element constructed by a positive meniscus lens having a convex surface facing to an object side, that a second lens group is composed of a first positive lens element, and a cemented lens constructed by a second positive lens element having a double convex shape cemented with a negative lens element, and that a third lens group is composed of a single positive lens element.

Moreover, it is more preferable that the most object side lens in the second lens group has a convex surface facing to the object side, the most image side lens of the second lens group has a concave surface facing to the image side, and the following conditional expression (2) is satisfied:

$$-3.0<(G2r1+G2r2)/(G2r2-G2r1)<-1.8 \quad (2)$$

where $G2r1$ denotes the radius of curvature of the most object side surface of the second lens group, and $G2r2$ denotes the radius of curvature of the most image side surface of the second lens group.

Conditional expression (2) defines the lens shape of the second lens group. When the ratio $(G2r1+G2r2)/(G2r2-G2r1)$ falls below the lower limit of conditional expression (2), spherical aberration produced by the positive lens element arranged to the most object side become excessive in the negative direction, so that correction of spherical aberration by the whole lens elements of the zoom lens system becomes difficult. On the other hand, when the ratio exceeds the conditional expression (2), spherical aberration produced by the negative lens element arranged to the most image side become excessive in the positive direction, so that correction of spherical aberration by the whole lens elements of the zoom lens system becomes difficult.

Moreover, in the present invention, it is preferable to satisfy the following conditional expression (3):

$$-2.0<(G3r1+G3r2)/(G3r2-G3r1)<-0.1 \quad (3)$$

where $G3r1$ denotes the radius of curvature of the most object side surface of the third lens group, and $G3r2$ denotes the radius of curvature of the most image side surface of the third lens group.

Conditional expression (3) defines the lens shape of the third lens group. When the ratio $(G3r1+G3r2)/(G3r2-G3r1)$ exceeds the upper limit of conditional expression (3), it becomes difficult to correct astigmatism and distortion satisfactorily. On the other hand, when the ratio falls below the lower limit of conditional expression (3), it becomes difficult to correct astigmatism and distortion satisfactorily, so that it is undesirable.

In addition, it is preferable that the second lens group or the third lens group has at least one aspherical surface.

An aspherical surface is expressed by the following expression:

$$X(y) \times y^2/[r \cdot [1+(1-k \cdot y^2/r^2)^{1/2}]] + C4 \cdot y^4 + C6 \cdot y^6 + C8 \cdot y^8 + C10 \cdot y^{10}$$

where $X(y)$ denotes the distance along the optical axis from the tangent plane on the vertex of the aspherical surface to the position of the aspherical surface at the height of y, r denotes a paraxial radius of curvature, K denotes the conical coefficient, and $C_i$ denotes i-th order aspherical surface coefficient.

In the present invention, it is preferable that the first lens group is moved, the second lens group is moved in the object direction, and the third lens group is fixed when the state of lens group positions is moved from a wide-angle end state to a telephoto end state.

Moreover, it is preferable that the third lens group is moved in the object direction when focusing from infinity to near object. By using above described construction, zooming mechanism can be simplified, so that a compact zoom lens system can be realized.

Numerical Examples according to the present invention is going to be explained below with reference to accompanying drawings.

EXAMPLE 1

FIG. 1 is a sectional view showing a zoom lens system according to Example 1 of the present invention. The zoom lens system is composed of, in order from an object side, a first lens group G1 having negative refractive power, an aperture stop SP, a second lens group G2 having positive refractive power, and a third lens group G3 having positive refractive power. When the state of lens group positions moves from a wide-angle end state to a telephoto end state, the first lens group G1 and the second lens group G2 are moved and the third lens group G3 is fixed such that the distance between the first lens group G1 and the second lens group G2 is decreased, and the distance between the second lens group G2 and the third lens group G3 is increased.

The first lens group G1 is composed of, in order from the object side, a negative lens element L11 constructed by a negative meniscus lens having a concave surface facing to the image side, a negative lens element L12 having a double concave shape, and a positive lens element L13 constructed by a positive meniscus lens having a convex surface facing to the object side. The second lens group G3 is composed of a positive lens element L21 having double convex shape, a positive lens element L22 having a double convex shape, and a negative lens element L23 having a double concave shape wherein the positive lens element L22 is cemented with the negative lens element L23 forming a cemented lens. Moreover, the object side surface of the positive lens element L21 having a double convex shape is an aspherical surface. The third lens group G3 is composed of a single positive lens element L31 having a double convex shape, whose object side surface is an aspherical surface.

Focusing from infinity to near object is conducted by moving the third lens group G3 in the object direction.

Various values associated with Example 1 are listed in Table 1. In the [Specifications], f denotes the focal length, FNO denotes the f-number, and 2ω denotes an angle of view. In [Lens Data], the first column is a surface number counted in order from the object side, the second column "r" is a radius of curvature of a lens surface, the third column "d" is a distance between adjacent lens surfaces, the fourth column "ν" is Abbe number, and the fifth column "n" is refractive index for d-line (λ=587.6 nm). In [Variable Distance Data], the focal length and variable distance values in the wide-angle end state, in the intermediate focal length state, and in telephoto end state are listed. In [Values for Conditional Expressions], value of the parameter in each conditional expression is shown. Values in the following each Example are denoted by the same reference symbols as Example 1.

In the tables for various values, "mm" is generally used for the unit of length such as the focal length, a radius of curvature, a distance between the adjacent surfaces. However, since an optical system proportionally enlarged or reduced its dimension can be obtained similar optical performance, the unit is not necessary to be limited to "mm" and any other suitable unit can be used.

Moreover, although the refractive index of the air is 1.00000, the value is abbreviated in Tables. In addition, the reference symbol "∞" in column of the radius of curvature denotes a plane. The reference symbol "E-n" in the aspherical data denotes "×10$^{-n}$"(where n is an integer.)

TABLE 1

| [Specifications] | | |
|---|---|---|
| | Wide-angle | Telephoto |
| f = | 5.97 | 16.88 |
| FNO = | 2.87 | 5.22 |

TABLE 1-continued

| 2ω = | 64.2° | 23.3° |
|---|---|---|

[Lens Data]

| | r | d | ν | n |
|---|---|---|---|---|
| 1) | 19.1828 | 1.1 | 37.17 | 1.834 |
| 2) | 7.3466 | 1.75 | | |
| 3) | −143.678 | 1 | 46.58 | 1.804 |
| 4) | 10.5443 | 0.8 | | |
| 5) | 10.4893 | 2.3 | 25.43 | 1.80518 |
| 6) | 120.8022 | (d6) | | |
| 7) | ∞ | 0.4 | | Aperture Stop |
| 8) | 9.692 | 2 | 59.62 | 1.58313 |
| 9) | −22.1432 | 0.1 | | |
| 10) | 7.4756 | 2.55 | 46.58 | 1.804 |
| 11) | −9.4517 | 0.9 | 30.13 | 1.69895 |
| 12) | 3.8988 | (d12) | | |
| 13) | 25.703 | 2.5 | 59.62 | 1.58313 |
| 14) | −13.609 | 0.6 | | |
| 15) | ∞ | 2.17 | 64.14 | 1.51633 |
| 16) | ∞ | | | |

[Aspherical Surface Data]

Surface Number = 8

κ = −0.9643
C4 = −4.44320E−5
C6 = −1.03700E−5
C8 = 1.33750E−6
C10 = −8.95360E−8

Surface Number = 13

κ = 16.8196
C4 = −4.51730E−4
C6 = 2.27170E−5
C8 = −1.52580E−6
C10 = 3.30560E−8

[Variable Distance Data]

| | Wide-angle | Intermediate | Telephoto |
|---|---|---|---|
| f | 5.97 | 10.00 | 16.88 |
| d6 | 13.451 | 6.223 | 1.853 |
| d12 | 5.078 | 9.655 | 17.474 |
| TL | 38.84 | 36.19 | 39.64 |

[Values for Conditional Expressions]

(1) $TL/(ft \times fw)^{1/2}$ = 3.87 (Wide-angle end state)
  = 3.6 (Intermediate focal length state)
  = 3.95 (Telephoto end state)
(2) (G2r1 + G2r2)/(G2r2 − G2r1) = −2.35
(3) (G3r1 + G3r2)/(G3r2 − G3r1) = −0.31

Figure 2:
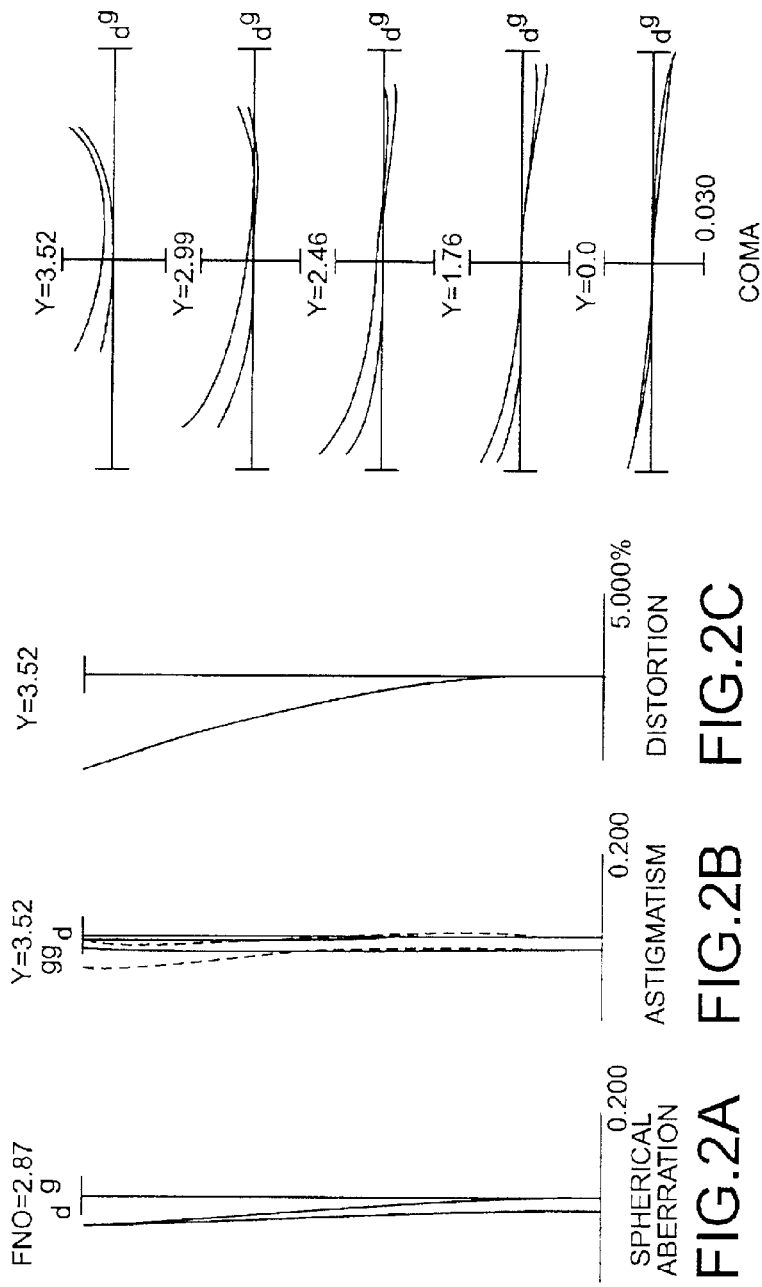
FIGS. 2A through 2E are graphs showing various aberrations of the zoom lens system according to Example 1 in a wide-angle end state.
Figure 3:
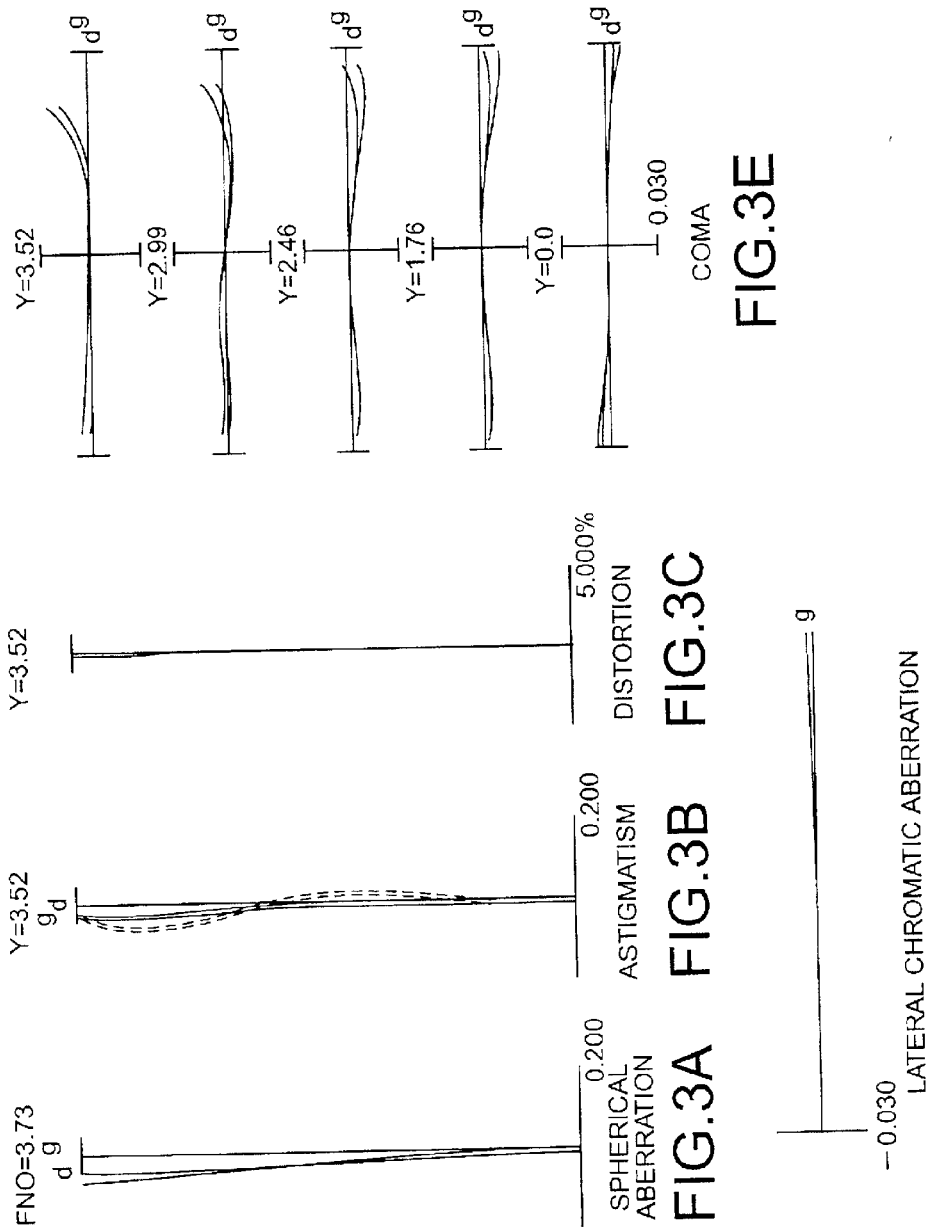
FIGS. 3A through 3E are graphs showing various aberrations of the zoom lens system according to Example 1 in an intermediate focal length state.
Figure 4:
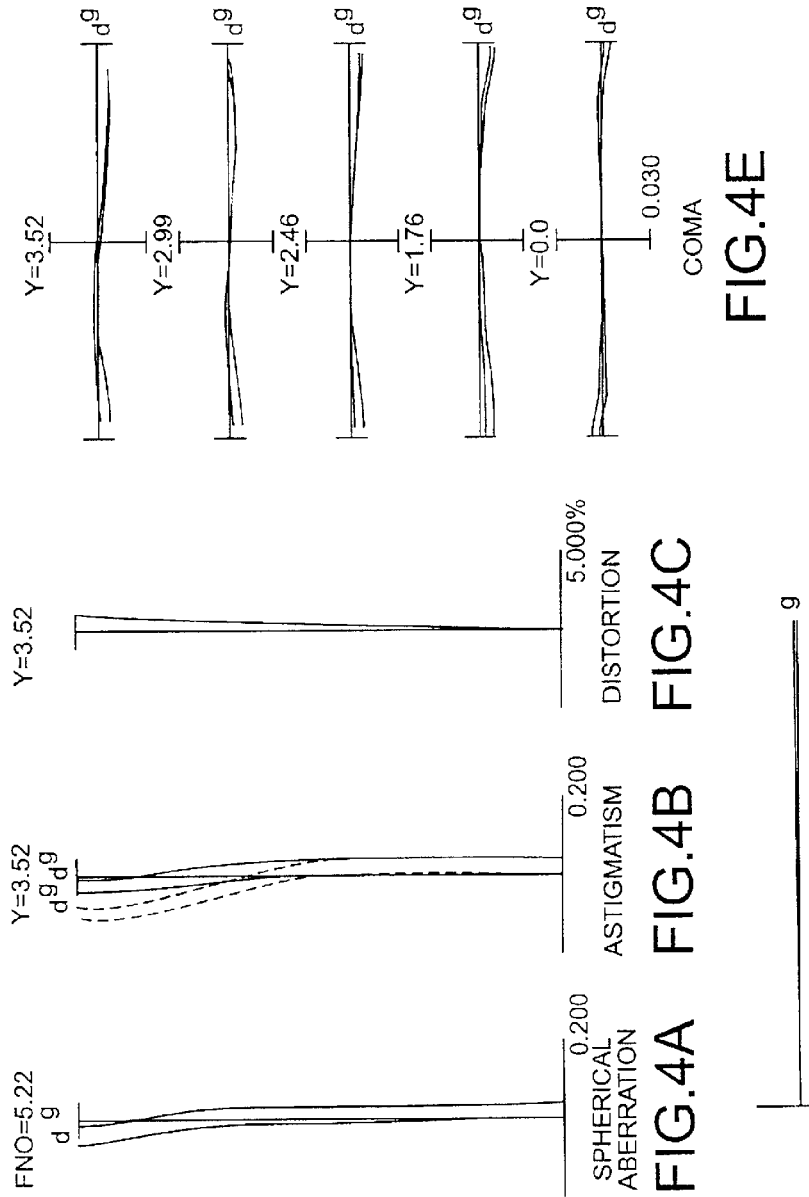
FIGS. 4A through 4E are graphs showing various aberrations of the zoom lens system according to Example 1 in a telephoto end state.

FIGS. 2 through 4 are graphs showing various aberrations in the wide-angle end state, intermediate focal length state, and telephoto end state according to Example 1 of the present invention, respectively. FIGS. 6 through 8 are graphs showing various aberrations in the wide-angle end state, intermediate focal length state, and telephoto end state according to Example 2 hereinafter described of the present invention, respectively. FIGS. 10 through 12 are graphs showing various aberrations in the wide-angle end state, intermediate focal length state, and telephoto end state according to Example 3 hereinafter described of the present invention, respectively.

In graphs for various aberrations in each figure, FNO denotes the f-number, Y denotes an image height. In the diagrams showing spherical aberration, the value of FNO is the f-number with respect to the maximum aperture. In the diagrams showing astigmatism and distortion, the value of Y denotes the maximum image height. In the diagrams showing coma, the value of Y denotes an image height for each image. Reference symbol d denotes d-line (λ=587.6 nm), and g denotes g-line (λ=435.6 nm). In the diagrams showing astigmatism, a solid line indicates a sagittal image plane and a broken line indicates a meridional image plane.

As is apparent from the respective graphs, the zoom lens system according to each Example shows superb optical performance as a result of good corrections to various aberrations.

EXAMPLE 2

Figure 5:
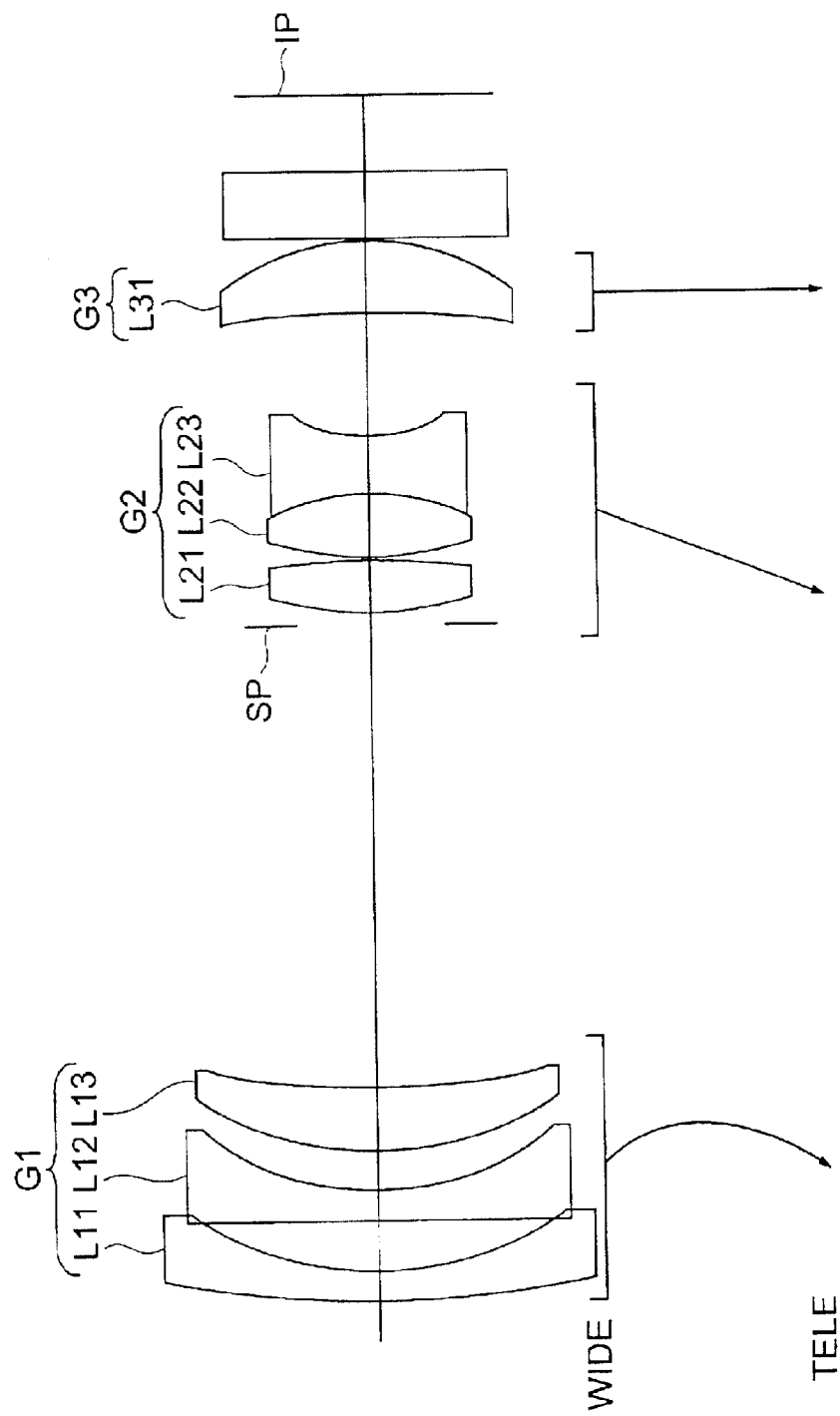
FIG. 5 is a sectional view showing a zoom lens system according to Example 2 of the present invention.

FIG. 5 is a sectional view showing a zoom lens system according to Example 2 of the present invention. The zoom lens system is composed of, in order from an object side, a first lens group G1 having negative refractive power, an aperture stop SP, a second lens group G2 having positive refractive power, and a third lens group G3 having positive refractive power. When the state of lens group positions moves from a wide-angle end state to a telephoto end state, the first lens group G1 and the second lens group G2 are moved and the third lens group G3 is fixed such that the distance between the first lens group G1 and the second lens group G2 is decreased, and the distance between the second lens group G2 and the third lens group G3 is increased.

The first lens group G1 is composed of, in order from the object side, a negative lens element L11 constructed by a negative meniscus lens having a concave surface facing to an image side, a negative lens element L12 constructed by a negative meniscus lens having a concave surface facing to the image side, and a positive lens element L13 constructed by a positive meniscus lens having a convex surface facing to the object side. The second lens group G2 is composed of a positive lens element L21 having double convex shape, a positive lens element L22 having a double convex shape, and a negative lens element L23 having a double concave shape wherein the positive lens element L22 is cemented with the negative lens element L23 forming a cemented lens. Moreover, the object side surface of the positive lens element L21 having a double convex shape is an aspherical surface. The third lens group G3 is composed of a single positive lens element L31 constructed by a positive meniscus lens having a convex surface facing to the image side, whose object side surface is an aspherical surface.

Focusing from infinity to near object is conducted by moving the third lens group G3 in the object direction.

Various values associated with Example 2 are listed in Table 2.

TABLE 2

[Specifications]

| | Wide-angle | Telephoto |
|---|---|---|
| f = | 5.80 | 16.24 |
| FNO = | 2.84 | 4.94 |
| 2ω = | 65.7° | 23.7° |

[Lens Data]

| | r | d | ν | n |
|---|---|---|---|---|
| 1) | 33.8416 | 1 | 39.59 | 1.8044 |
| 2) | 10.7972 | 1.6011 | | |
| 3) | 879.053 | 1 | 58.96 | 1.51823 |
| 4) | 8.4702 | 1.3481 | | |
| 5) | 9.9318 | 2.0681 | 25.43 | 1.80518 |
| 6) | 21.0498 | (d6) | | |
| 7) | ∞ | 0.4 | | Aperture Stop |
| 8) | 8.9099 | 1.7263 | 59.62 | 1.58313 |
| 9) | −22.9821 | 0.1 | | |
| 10) | 9.1096 | 2.1307 | 47.38 | 1.788 |
| 11) | −6.9597 | 1.8562 | 32.11 | 1.6727 |

TABLE 2-continued

| | | | | |
|---|---|---|---|---|
| 12) | 3.9539 | (d12) | | |
| 13) | −150.82 | 2.3 | 59.62 | 1.58313 |
| 14) | −7.8079 | 0.1 | | |
| 15) | ∞ | 2.17 | 64.2 | 1.5168 |
| 16) | ∞ | | | |

[Aspherical Surface Data]

Surface Number = 8

κ = −1.6093
C4 = −1.86340E−5
C6 = −6.64410E−6
C8 = −4.94360E−7
C10 = 4.39150E−8

Surface Number = 13

κ = 54.8059
C4 = −1.04020E−3
C6 = 4.89310E−5
C8 = −2.91910E−6
C10 = 6.66510E−8

[Variable Distance Data]

| | Wide-angle | Intermediate | Telephoto |
|---|---|---|---|
| f | 5.80 | 10.44 | 16.24 |
| d6 | 15.519 | 6.092 | 1.883 |
| d12 | 4.111 | 8.543 | 14.083 |
| TL | 39.94 | 34.95 | 36.28 |

[Values for Conditional Expressions]

(1) $TL/(ft \times fw)^{1/2}$ = 4.12 (Wide-angle end state)
 = 3.6 (Intermediate focal length state)
 = 3.74 (Telephoto end state)
(2) $(G2r1 + G2r2)/(G2r2 − G2r1)$ = −2.6
(3) $(G3r1 + G3r2)/(G3r2 − G3r1)$ = −1.11

EXAMPLE 3

FIG. 9 is a sectional view showing a zoom lens system according to Example 3 of the present invention. The zoom lens system is composed of, in order from an object side, a first lens group G1 having negative refractive power, an aperture stop SP, a second lens group G2 having positive refractive power, and a third lens group G3 having positive refractive power. When the state of lens group positions moves from a wide-angle end state to a telephoto end state, the first lens group G1 and the second lens group G2 are moved and the third lens group G3 is fixed such that the distance between the first lens group G1 and the second lens group G2 is decreased, and the distance between the second lens group G2 and the third lens group G3 is increased.

The first lens group G1 is composed of, in order from the object side, a negative lens element L11 constructed by a negative meniscus lens having a concave surface facing to an image side, a negative lens element L12 constructed by a negative meniscus lens having a concave surface facing to the image side, and a positive lens element L13 constructed by a positive meniscus lens having a convex surface facing to the object side. The second lens group G3 is composed of a positive lens element L21 having double convex shape, a positive lens element L22 having a double convex shape, and a negative lens element L23 having a double concave shape wherein the positive lens element L22 is cemented with the negative lens element L23 forming a cemented lens. Moreover, the object side surface of the positive lens element L21 having a double convex shape is an aspherical surface. The third lens group G3 is composed of a single positive lens element L31 having a convex surface facing to the image side, whose object side surface is an aspherical surface.

Focusing from infinity to near object is conducted by moving the third lens group G3 in the object direction.

Various values associated with Example 3 are listed in Table 3.

TABLE 3

[Specifications]

| | Wide-angle | Telephoto |
|---|---|---|
| f = | 5.80 | 16.24 |
| FNO = | 2.84 | 4.93 |
| 2ω = | 65.6° | 23.7° |

[Lens Data]

| | r | d | ν | n |
|---|---|---|---|---|
| 1) | 26.083 | 1 | 39.59 | 1.8044 |
| 2) | 9.8417 | 1.8042 | | |
| 3) | 1857.5031 | 1 | 58.96 | 1.51823 |
| 4) | 8.5385 | 1.1676 | | |
| 5) | 9.789 | 2.0846 | 25.43 | 1.80518 |
| 6) | 20.6297 | (d6) | | |
| 7) | ∞ | 0.4 | | Aperture Stop |
| 8) | 11.2714 | 1.63 | 59.62 | 1.58313 |
| 9) | −22.6904 | 0.1 | | |
| 10) | 7.6838 | 2.218 | 47.38 | 1.788 |
| 11) | −7.0146 | 1.666 | 32.11 | 1.6727 |
| 12) | 3.929 | (d12) | | |
| 13) | 109.4427 | 2.3 | 59.62 | 1.58313 |
| 14) | −8.9226 | 0.1 | | |
| 15) | ∞ | 2.17 | 64.2 | 1.5168 |
| 16) | ∞ | | | |

[Aspherical Surface Data]

Surface Number = 8

κ = −1.8821
C4 = −6.84660E−5
C6 = −2.62290E−5
C8 = 3.00390E−6
C10 = −1.75730E−7

Surface Number = 13

κ = 75.3961
C4 = −7.23310E−4
C6 = −1.97710E−5
C8 = −1.04730E−6
C10 = 2.46130E−8

[Variable Distance Data]

| | Wide-angle | Intermediate | Telephoto |
|---|---|---|---|
| f | 5.80 | 10.44 | 16.24 |
| d6 | 15.432 | 6.060 | 1.876 |
| d12 | 4.358 | 8.885 | 14.543 |
| TL | 39.94 | 35.1 | 36.57 |

[Values for Conditional Expressions]

(1) $TL/(ft \times fw)^{1/2}$ = 4.12 (Wide-angle end state)
 = 3.62 (Intermediate focal length state)
 = 3.77 (Telephoto end state)
(2) $(G2r1 + G2r2)/(G2r2 − G2r1)$ = −2.07
(3) $(G3r1 + G3r2)/(G3r2 − G3r1)$ = −0.85

As described above, the present invention makes it possible to provide a zoom lens system suitable for a image gathering system using a solid-state imaging device, having a zoom ratio of about three, a small total lens length, and superb optical performance.

Additional advantages and modification will readily occur to those skilled in the art. Therefore, the invention in its broader aspects is not limited to the specific details, and representative devices shown and described herein.

Accordingly, various modifications may be made without departing from the spirit or scope of the general inventive concept as defined by the appended claims and their equivalents.

What is claimed is:

1. A zoom lens system comprising, in order from an object: a first lens group having negative refractive power; a second lens group having positive refractive power; and a third lens group having positive refractive power; zooming being carried out by varying distances between adjacent lens groups;

wherein the first lens group includes two negative lens elements and a positive lens element, the second lens group includes three lens elements consisting of, in order from the object, a first positive lens element, a second positive lens element having a double convex shape, and a negative lens element, and the third lens group includes at least one positive lens element;

wherein the third lens group is fixed when the state of lens group positions is moved from a wide-angle end state to a telephoto end state; and wherein the following conditional expression is satisfied at least in both a wide-angle end state and a telephoto end state within a whole zooming range:

$$2.5 < TL/(ft \times fw)^{1/2} < 4.2$$

where TL denotes the distance between the most object side lens surface of the zoom lens system and the image plane, fw denotes the focal length of the zoom lens system in a wide-angle end state, and ft denotes the focal length of the zoom lens system in a telephoto end state.

2. The zoom lens system according to claim 1, wherein the second lens group includes at least one aspherical surface.

3. The zoom lens system according to claim 1, wherein the first lens group consists of:

a first negative lens element constructed by a negative meniscus lens having a concave surface facing to the image side, a second negative lens element, and a positive lens element constructed by a positive meniscus lens having a convex surface facing to the object side, the second lens group consists of:

a first positive lens element, a cemented lens constructed by a second positive lens element having a double convex shape cemented with a negative lens element, and the third lens group consists of a single positive lens element.

4. The zoom lens system according to claim 3, wherein the most object side lens surface of the second lens group has a convex shape facing to the object side, the most image side lens surface of the second lens group has a concave shape facing to the image side, and the following conditional expression is satisfied:

$$-3.0 < (G2r1+G2r2)/(G2r2-G2r1) < -1.8$$

where G2r1 denotes the radius of curvature of the most object side lens surface of the second lens group, and G2r2 denotes the radius of curvature of the most image side lens surface of the second lens group.

5. The zoom lens system according to claim 3, wherein the following conditional expression is satisfied:

$$-2.0 < (G3r1+G3r2)/(G3r2-G3r1) < -0.1$$

where G3r1 denotes the radius of curvature of the most object side lens surface of the third lens group, and G3r2 denotes the radius of curvature of the most image side lens surface of the third lens group.

6. The zoom lens system according to claim 1, wherein the positive lens element of the third lens group has at least one aspherical surface.

7. The zoom lens system according to claim 1, wherein focusing from infinity to near object is conducted by moving the third lens group in the object direction.

8. A zoom lens system comprising, in order from an object: a first lens group having negative refractive power; a second lens group having positive refractive power; and a third lens group having positive refractive power; zooming being carried out by varying distances between adjacent lens groups, wherein the first lens group includes two negative lens elements and a positive lens element, the second lens group includes three lens elements consisting of a first positive lens element, a second positive lens element, and a negative lens element, and the third lens group includes at least one positive lens element having a double convex shape, wherein the third lens group is fixed when the state of lens group positions is moved from a wide-angle end state to a telephoto end state, and wherein the following conditional expression is satisfied at least in both a wide-angle end state and a telephoto end state within a whole zooming range:

$$2.5 < TL/(ft \times fw)^{1/2} < 4.2$$

where TL denotes the distance between the most object side lens surface of the zoom lens system and the image plane, fw denotes the focal length of the zoom lens system in a wide-angle end state, and ft denotes the focal length of the zoom lens system in a telephoto end state.

* * * * *